(12) United States Patent
May et al.

(10) Patent No.: US 9,985,994 B2
(45) Date of Patent: *May 29, 2018

(54) ENFORCING COMPLIANCE WITH A POLICY ON A CLIENT

(71) Applicant: Fortinet, Inc., Sunnyvale, CA (US)

(72) Inventors: Robert Alvin May, Vancouver (CA); Wei Wang, Burnaby (CA); Tao Huang, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 133 days.

This patent is subject to a terminal disclaimer.

(21) Appl. No.: 14/958,943

(22) Filed: Dec. 4, 2015

(65) Prior Publication Data

US 2016/0255116 A1 Sep. 1, 2016

Related U.S. Application Data

(63) Continuation of application No. 13/731,474, filed on Dec. 31, 2012, now Pat. No. 9,306,976, which is a continuation of application No. 11/409,401, filed on Apr. 21, 2006, now Pat. No. 8,935,416.

(51) Int. Cl.

| | |
|---|---|
| *H04L 29/06* | (2006.01) |
| *G06F 21/56* | (2013.01) |
| *G06F 21/60* | (2013.01) |
| *H04L 12/24* | (2006.01) |
| *H04L 29/08* | (2006.01) |
| *G06F 15/16* | (2006.01) |
| *H04L 12/66* | (2006.01) |

(52) U.S. Cl.
CPC .............. *H04L 63/20* (2013.01); *G06F 15/16* (2013.01); *G06F 21/56* (2013.01); *G06F 21/606* (2013.01); *H04L 12/66* (2013.01); *H04L 41/0893* (2013.01); *H04L 63/108* (2013.01); *H04L 67/02* (2013.01); *G06F 2212/502* (2013.01); *H04L 29/06* (2013.01); *H04L 63/0227* (2013.01); *H04L 63/102* (2013.01); *H04L 63/205* (2013.01)

(58) Field of Classification Search
CPC .... H04L 63/0227; H04L 63/108; H04L 63/20
See application file for complete search history.

(56) References Cited

U.S. PATENT DOCUMENTS

| | | | |
|---|---|---|---|
| 5,850,559 A | 12/1998 | Angelo et al. | |
| 5,925,127 A | 7/1999 | Ahmad | |
| 6,021,491 A | 2/2000 | Renaud | |
| 6,195,689 B1 | 2/2001 | Bahlmann | |
| 6,202,156 B1 * | 3/2001 | Kalajan ................. | H04L 29/06 709/225 |

(Continued)

OTHER PUBLICATIONS

Merriam-Webster, "temporary", 2014.

(Continued)

*Primary Examiner* — David J Pearson
(74) *Attorney, Agent, or Firm* — Law Office of Dorian Cartwright; Dorian Cartwright

(57) ABSTRACT

A method and system for enforcing compliance with a policy on a client computer in communication with a network is disclosed. The method involves receiving a data transmission from the client computer on the network. The data transmission includes status information associated with the client computer. The data transmission is permitted to continue when the status information meets a criterion.

17 Claims, 8 Drawing Sheets

(56) References Cited

U.S. PATENT DOCUMENTS

| | | |
|---|---|---|
| 6,209,101 B1 | 3/2001 | Mitchem |
| 6,362,836 B1 | 3/2002 | Shaw et al. |
| 6,438,594 B1 | 8/2002 | Bowman-Amuah |
| 6,466,932 B1 | 10/2002 | Dennis et al. |
| 6,578,074 B1 | 6/2003 | Bahlmann |
| 6,873,988 B2 | 3/2005 | Herrmann et al. |
| 6,950,818 B2 | 9/2005 | Dennis et al. |
| 7,020,697 B1 | 3/2006 | Goodman et al. |
| 7,073,198 B1 * | 7/2006 | Flowers .............. H04L 63/1433 713/151 |
| 7,127,524 B1 | 10/2006 | Renda et al. |
| 7,139,999 B2 | 11/2006 | Bowman-Amuah |
| 7,140,042 B2 * | 11/2006 | Verma .................... G06F 21/10 726/26 |
| 7,181,766 B2 | 2/2007 | Bendinelli et al. |
| 7,240,364 B1 | 7/2007 | Branscomb et al. |
| 7,310,314 B1 | 12/2007 | Katz et al. |
| 7,506,371 B1 | 3/2009 | Ben-Natan |
| 7,526,800 B2 | 4/2009 | Wright et al. |
| 7,532,875 B1 | 5/2009 | Parks et al. |
| 7,630,381 B1 | 12/2009 | Roskind et al. |
| 7,636,736 B1 | 12/2009 | Kumar |
| 7,685,424 B2 | 3/2010 | Walmsley et al. |
| 7,689,722 B1 | 3/2010 | Timms et al. |
| 7,739,725 B1 | 6/2010 | Zhang et al. |
| 7,845,010 B2 | 11/2010 | Fujimoto et al. |
| 8,229,888 B1 | 7/2012 | Roskind |
| 8,244,841 B2 | 8/2012 | Shaji et al. |
| 8,935,416 B2 * | 1/2015 | May ........................ G06F 21/56 709/229 |
| 9,003,484 B2 * | 4/2015 | May ........................ G06F 21/56 709/223 |
| 9,306,976 B2 * | 4/2016 | May ........................ G06F 21/56 |
| 2002/0104015 A1 | 8/2002 | Barzilai et al. |
| 2002/0178249 A1 | 11/2002 | Prabakaran |
| 2003/0041125 A1 | 2/2003 | Salomon |
| 2003/0055994 A1 | 3/2003 | Herrmann et al. |
| 2003/0065793 A1 | 4/2003 | Kouznetsov et al. |
| 2003/0123672 A1 | 7/2003 | Srinivasan et al. |
| 2003/0172302 A1 | 9/2003 | Judge et al. |
| 2004/0039827 A1 | 2/2004 | Thomas et al. |
| 2004/0054930 A1 | 3/2004 | Walker et al. |
| 2004/0093493 A1 | 5/2004 | Bisbee et al. |
| 2004/0103310 A1 * | 5/2004 | Sobel .................... H04L 63/105 726/15 |
| 2004/0167872 A1 | 8/2004 | Shteyn |
| 2004/0181517 A1 | 9/2004 | Jung et al. |
| 2004/0204949 A1 | 10/2004 | Shaji et al. |
| 2004/0210666 A1 | 10/2004 | Selitrennikoff et al. |
| 2004/0255137 A1 | 12/2004 | Ying |
| 2004/0268149 A1 * | 12/2004 | Aaron .................... H04L 63/02 726/11 |
| 2005/0021614 A1 | 1/2005 | Bahlmann |
| 2005/0033707 A1 | 2/2005 | Ehlers et al. |
| 2005/0055412 A1 | 3/2005 | Kaminsky et al. |
| 2005/0068169 A1 | 3/2005 | Copley et al. |
| 2005/0071650 A1 | 3/2005 | Jo et al. |
| 2005/0132347 A1 | 6/2005 | Harper |
| 2005/0222933 A1 | 10/2005 | Wesby |
| 2005/0246716 A1 | 11/2005 | Smith et al. |
| 2005/0246767 A1 * | 11/2005 | Fazal .................... H04L 63/065 726/11 |
| 2006/0039260 A1 | 2/2006 | Hirasawa |
| 2006/0047826 A1 | 3/2006 | Cromer et al. |
| 2006/0059099 A1 | 3/2006 | Ronning et al. |
| 2006/0059102 A1 | 3/2006 | Ebihara et al. |
| 2006/0080352 A1 | 4/2006 | Boubez et al. |
| 2006/0101409 A1 * | 5/2006 | Bemmel ............. H04L 63/0209 717/126 |
| 2006/0120526 A1 | 6/2006 | Boucher et al. |
| 2006/0161979 A1 | 7/2006 | Pandey et al. |
| 2006/0165103 A1 | 7/2006 | Trudeau et al. |
| 2006/0179058 A1 | 8/2006 | Bram et al. |
| 2006/0195566 A1 | 8/2006 | Hurley |
| 2006/0218010 A1 | 9/2006 | Michon et al. |
| 2006/0250968 A1 | 11/2006 | Hudis et al. |
| 2006/0271495 A1 | 11/2006 | Grass et al. |
| 2006/0282393 A1 | 12/2006 | Sladek |
| 2006/0294219 A1 | 12/2006 | Ogawa et al. |
| 2007/0039046 A1 | 2/2007 | Van Dijk et al. |
| 2007/0086433 A1 | 4/2007 | Cunetto et al. |
| 2007/0115922 A1 | 5/2007 | Schneider et al. |
| 2007/0130343 A1 | 6/2007 | Pardo-Blazquez et al. |
| 2007/0150948 A1 * | 6/2007 | De Spiegeleer ........ G06F 21/56 726/22 |
| 2007/0169170 A1 * | 7/2007 | Shiran ................. H04L 63/1466 726/2 |
| 2007/0174405 A1 | 7/2007 | Chen et al. |
| 2007/0250627 A1 | 10/2007 | May et al. |
| 2009/0147299 A1 | 6/2009 | Tetu |
| 2009/0217385 A1 | 8/2009 | Teow et al. |
| 2010/0064341 A1 | 3/2010 | Aldera |
| 2012/0011561 A1 | 1/2012 | Courtney et al. |
| 2013/0185762 A1 | 7/2013 | May et al. |
| 2013/0210389 A1 | 8/2013 | Obaidi |
| 2014/0259098 A1 | 9/2014 | May et al. |

OTHER PUBLICATIONS

Merriam-Webster, "policy", 2015.
Fielding, R., et al., "RFC 2616—Hypertext Transfer Protocol—HTTP/1.1", (c) 1999 The Internet Society. [online]. [retrieved Dec. 28, 2004]. Retrieved from the Internet: <URL:http://www.faqs.org/rfcs/rfc2616.html>, (Jun. 1999), 1-140.
Merriam-Webster, "status", 2015.
Merriam-Webster, "temporary", 2015.
Merriam-Webster, "nonce", 2015.

* cited by examiner

ENFORCING COMPLIANCE WITH A POLICY ON A CLIENT

RELATED APPLICATION DATA

This application claims priority as a continuation of U.S. patent application Ser. No. 13/731,474, filed Dec. 31, 2012, which is a continuation of U.S. patent application Ser. No. 11/409,401, filed Apr. 21, 2006, now issued as U.S. Pat. No. 8,935,416, the contents of each being hereby incorporated in their entirety.

BACKGROUND OF THE INVENTION

Field of Invention

This invention relates generally to computer networks and network security, and more particularly to a method, apparatus, signals, and medium for enforcing a policy on a client computer.

Description of Related Art

The rapid expansion of high-speed Internet connections and the use of the World Wide Web for commerce, entertainment, and education have provided significant benefits to the global user community.

Enterprises have come to increasingly rely on their internal and external networks for information dissemination, service delivery, communications, and data storage, for example, such enterprises have become particularly vulnerable to disruptions to both internal and external network services. Disruptions may occur from, for example, malicious code such as computer viruses that may be transmitted via email or other file transfers from an external network. Enterprises may also need to protect sensitive information in their internal network from access by unauthorized users and/or control or restrict certain client usage of the network, such as access to certain web sites, for example.

Many network administrators protect the integrity of their networks by installing software and devices to prevent disruption or intrusion. Administrators may further require that all computers connected to their network have client security software installed for providing additional client level protection against viruses and intrusions.

Unfortunately users of a client computer may, for one reason or another, disable client security software or alter the configuration such that the client computer is not adequately protected. In some situations a virus or intrusion to the network may be launched by the un-protected client computer, thus affecting other clients on the network and even disrupting the entire network.

There is thus a desire to exercise some control over the configuration of the operation and configuration of security software on networked client computers.

SUMMARY OF THE INVENTION

In accordance with one aspect of the invention there is provided a method for enforcing compliance with a policy on a client computer in communication with a network. The method involves receiving a data transmission from the client computer on the network. The data transmission includes status information associated with the client computer. The data transmission is permitted to continue when the status information meets a criterion.

The method may involve preventing the data transmission from continuing when the data transmission does not include status information.

Permitting the data transmission to continue may involve authenticating a user of the client computer before permitting the data transmission to continue.

The method may involve causing an action to be taken when the status information does not meet the criterion.

Causing the action to be taken may involve causing an entry to be made in a log.

Causing the action to be taken may involve causing an alert to be issued. Causing the alert to be issued may involve sending a message to an administrator of the network.

Causing the action to be taken May involve preventing the data transmission from continuing.

The method may involve sending a message to the client computer indicating at least one of the data transmission has been prevented from continuing, aspects of the criterion that are not met by the status information, and a network resource location for downloading data for updating a configuration of the client computer.

Sending the message indicating the network resource location may involve sending a message indicating at least one of a location of a client security program image for installing client security program on the client computer, a location of a file for updating anti-virus signatures associated with potential computer virus attacks, and a location of a file for updating intrusion protection system (IPS) signatures associated with potential network intrusions.

Sending the message indicating aspects of the criterion that are not met by the status information may involve producing a message indicating at least one of a software license associated with client security program installed on the client computer is not valid, and a configuration associated with the client security program fails to meet the criterion.

The data transmission may comply with a Hyper Text Transfer Protocol (HTTP) and sending the message may involve sending a HTTP redirect response to the client computer redirecting the client computer to a web page.

Redirecting may involve redirecting the client computer to a web page including at least one link to a network resource location for downloading data for updating a configuration of the client computer.

Receiving the data transmission may involve receiving a data transmission from the client computer including data complying with one of a hypertext transfer protocol (HTTP), a simple mail transport protocol (SMTP), an internet message access protocol (IMAP), a post office protocol (POP), a telnet protocol, a domain name system (DNS) protocol, a voice over internet protocol (VoiP), a peer-to-peer (P2P) protocol, a dynamic host configuration protocol (DHCP), and a point-to-point (PPP) protocol.

Permitting the data transmission to continue may involve permitting the data transmission to continue when the status information meets a criterion set by an administrator of the network.

Permitting the data transmission to continue when the status information meets the criterion may involve permitting subsequent data transmissions to continue until at least one of a first period of time expires, and the client computer has not initiated any subsequent data transmissions for a second period of time.

The network may include a first network and the method may involve receiving the data transmission at a gateway node on the first network, the gateway node being in communication with a second network, and permitting the data transmission to continue may involve permitting the data transmission to the second network when the status information meets the criterion.

Permitting the data transmission to continue may involve reading the status information and comparing at least some of the status information against at least one criterion in a table of criteria stored on the gateway node and permitting the data transmission to the second network when the at least some of the status information satisfies the at least one criterion.

Permitting the data transmission to continue when the status information meets the criterion may involve generating a temporary policy for the client computer, the temporary policy including information identifying the client computer and subsequent data transmissions from the client computer may be permitted to continue without reading status information included in the subsequent data transmissions, while the temporary policy exists.

The method may involve causing the temporary policy to expire when at least one of a first period of time expires, and when the client computer has not initiated any subsequent data transmissions for a second period of time.

The method may involve storing a client security program installation image on the gateway node, the installation image including codes for installing a client security program on the client computer.

In accordance with another aspect of the invention there is provided a computer-readable medium encoded with codes for directing a processor circuit to receive a data transmission from a client computer, the data transmission including status information associated with the client computer to permit the data transmission to continue when the status information meets a criterion.

The codes may be encoded on one of a Compact Disk Read-only Memory (CD ROM) and a computer-readable signal.

In accordance with another aspect of the invention there is provided an apparatus for enforcing compliance with a policy on a client computer in communication with a network. The apparatus includes provisions for receiving a data transmission from the client computer, the data transmission including status information associated with the client computer. The apparatus also includes provisions for permitting the data transmission to continue when the status information meets a criterion.

In accordance with another aspect of the invention there is provided a method implemented on a client computer for enforcing compliance with a policy. The method involves causing a data transmission from the client computer on a first network to include status information associated with the client computer, the data transmission being destined• for a second network, the status information for permitting the data transmission to continue on the second network when the status information meets a criterion. The second network is in communication with the first network.

The method may involve performing a status enquiry on the client computer to determine the status information associated with the client computer.

Performing the status enquiry may involve determining at least one of whether a client security program is running on the client computer, version information associated with the client security program installed on the client computer, license information associated with the client security program installed on the client computer, configuration information associated with the client security program installed on the client computer, version information associated with an anti-virus signature database stored on the client computer, version information associated with an intrusion protection system (IPS) signature database stored on the client computer, firewall zone configuration information associated with the client computer, and information associated with other software installed on the client computer.

Determining the configuration information may involve reading configuration data from a configuration file associated with the client security program installed on the client computer and may further involve generating a hash of the configuration data, the hash being included in the status information.

Causing the data transmission to include status information may involve causing the data transmission to include a data record including an identifier field identifying the client computer and at least one field including status information associated with the client computer.

Causing the data transmission to include the data record may involve causing the data transmission to include a data record including at least one of a length field for holding length information identifying a length of the data record, and a checksum field for holding checksum information associated with the data record.

Causing the data transmission to include the data record may involve causing the data transmission to include a binary coded data record.

Causing the data transmission to include a binary coded data record may involve causing the data transmission to include a data record including American Standard Code for Information Interchange (ASCII) characters representing the binary coded data record.

The method may involve encrypting the data record.

Causing the data transmission to include status information may involve monitoring programs running on the client computer and intercepting data transmission initiated by the programs and including in the data transmissions at least one data record including status information associated with the client computer.

In accordance with another aspect of the invention there is provided a computer-readable medium encoded with codes for directing a processor circuit to cause a data transmission from a client computer on a first network to include status information associated with the client computer, the data transmission being destined for a second network, the status information for permitting the data transmission to continue on the second network when the status information meets a criterion. The second network is in communication with the first network.

The codes may be encoded on one of a Compact Disk Read-only Memory (CD ROM) and a computer-readable signal.

In accordance with another aspect of the invention there is provided a gateway node apparatus for enforcing a policy on a client computer, the gateway node apparatus and the client computer being in communication with first network. The gateway node apparatus includes an interface operable to receive a data transmission from the client computer, the data transmission including status information associated with the client computer. The gateway node apparatus also includes a processor circuit and at least one computer-readable medium encoded with codes for directing the processor circuit to permit the data transmission to continue when the status information meets a criterion.

The computer-readable medium may include codes for directing the processor circuit to prevent the data transmission from continuing when the data transmission does not include status information.

The computer-readable medium may include codes for directing the processor circuit to authenticate a user of the client computer before permitting the data transmission to continue.

The computer-readable medium may include codes for directing the processor circuit to cause an action to be taken when the status information does not meet the criterion.

The computer-readable medium may include codes for directing the processor circuit to cause an entry to be made in a log.

The computer-readable medium may include codes for directing the processor circuit to cause an alert to be issued.

The alert may include a message sent to an administrator of the network.

The computer-readable medium may include codes for directing the processor circuit to prevent the data transmission from continuing.

The computer-readable medium may include codes for directing the processor circuit to send a message to the client computer indicating at least one of the data transmission has been prevented from continuing, aspects of the criterion that are not met by the status information, and a network resource location for downloading data for updating a configuration of the client computer.

The message indicating the network resource location may include information indicating at least one of a location of a client security program image for installing a client security program on the client computer, a location of a file for updating anti-virus signatures associated with potential computer virus attacks, and a location of a file for updating intrusion protection system (IPS) signatures associated with potential network intrusions.

The message indicating aspects of the criterion that are not met by the status information may include information indicating at least one of a software license associated with the client security program installed on the client computer is not valid, and a configuration associated with the client security program fails to meet the criterion.

The data transmission may comply with a Hyper Text Transfer Protocol (HTTP) and the message may include a HTTP redirect response sent to the client computer redirecting the client computer to a web page.

The web page may include at least one link to a network resource location for downloading data for updating a configuration of the client computer.

The data transmission may include data complying with one of a hypertext transfer protocol {HTTP), a simple mail transport protocol (SMTP), an internet message access protocol (IMAP), a post office protocol (POP), a telnet protocol, a domain name system (DNS) protocol, a voice over internet protocol (VoiP), a peer-to-peer (P2P) protocol, a dynamic host configuration protocol (DHCP), and a point-to-point (PPP) protocol.

The criterion may include at least one criterion set by an administrator of the network.

The network may include a first network, and the apparatus may further include a second interface in communication with a second network, and the data transmission may include a data transmission destined for the second network, the computer-readable medium further including codes for directing the processor circuit to permit the data transmission to the second network when the status information meets the criterion.

The apparatus may include a table of criteria stored in a memory on the apparatus and the computer-readable medium may further include codes for directing the processor circuit to read the status information and compare at least some of the status information with at least one criterion in the table of criteria and to permit the data transmission to the second network when the at least some of the status information satisfies the at least one criterion.

The computer-readable medium may further include codes for directing the processor circuit to generate a temporary policy for the client computer, the temporary policy including information identifying the client computer and subsequent data transmissions from the client computer are permitted to continue without reading status information included in the subsequent data transmissions, while the temporary policy exists.

The temporary policy may include time information, the time information facilitating a determination of a period of time since the temporary policy was created.

The computer-readable medium may include codes for directing the processor circuit to cause the temporary policy to expire when at least one of a first period of time expires, and when the client computer has not initiated any subsequent data transmissions for a second period of time.

The apparatus may include a client security program installation image stored in memory on the apparatus, the installation image including codes for installing a client security program on the client computer.

In accordance with another aspect of the invention there is provided a client computer apparatus for enforcing compliance with a policy. The apparatus includes a processor circuit and an interface operably configured to permit the client computer to communicate with a first network. The apparatus also includes a computer-readable medium encoded with codes for directing the processor circuit to cause a data transmission from the client computer on the first network to include status information associated with the client computer, the data transmission being destined for a second network, the status information for permitting the data transmission to continue on the second network when the status information meets a criterion. The second network is in communication with the first network.

The computer-readable medium may include codes for directing the processor circuit to perform a status enquiry on the client computer to determine the status information associated with the client computer. The status information may include at least one of an indication of whether a client security program is running on the client computer, version information associated with the client security program installed on the client computer, license information associated with the client security program installed on the client computer, configuration information associated with the client security program installed on the client computer, version information associated with an anti-virus signature database stored on the client computer, version information associated with an intrusion protection system (IPS) signature database stored on the client computer, firewall zone configuration information associated with the client computer, and information associated with other software installed on the client computer.

The configuration information associated with the client security program may include information stored in a configuration file and the computer-readable medium may include codes for directing the processor circuit to read configuration data from the configuration file and to generate a hash of the configuration data, the hash being included in the status information.

The status information may include a data record including an identifier field identifying the client computer and at least one field including status information associated with the client computer.

The data record may include at least one of a length field for holding length information identifying a length of the data record, and checksum field for holding checksum information associated with the data record.

The data record may include a binary coded data record.

The binary coded data record may include a base64 binary coded data record.

The data record may include an encrypted data record.

The computer-readable medium may include codes for directing the processor circuit to intercept a data transmission initiated by a program running on the client computer and to insert in the data transmission, at least one data record including status information associated with the client computer.

In accordance with another aspect of the invention there is provided a system for enforcing compliance with a policy. The system includes a client computer in communication with a first network. The client computer includes a first processor circuit and an interface operably configured to permit the client computer to communicate with the first network. The system also includes a computer-readable medium encoded with codes for directing the first processor circuit to cause a data transmission from the client computer on the first network to include status information associated with the client computer, the data transmission being destined for a second network. The system further includes a gateway node in communication with the first network and the second network. The gateway node includes an interface operable to receive the data transmission from the client computer on the first network, a second processor circuit, and at least one computer-readable medium encoded with codes for directing the second processor circuit to permit the data transmission to continue on the second network when the status information meets a criterion.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

There is thus a desire to exercise some control over the configuration of the operation and configuration of security software on networked client computers.

Figure 1:
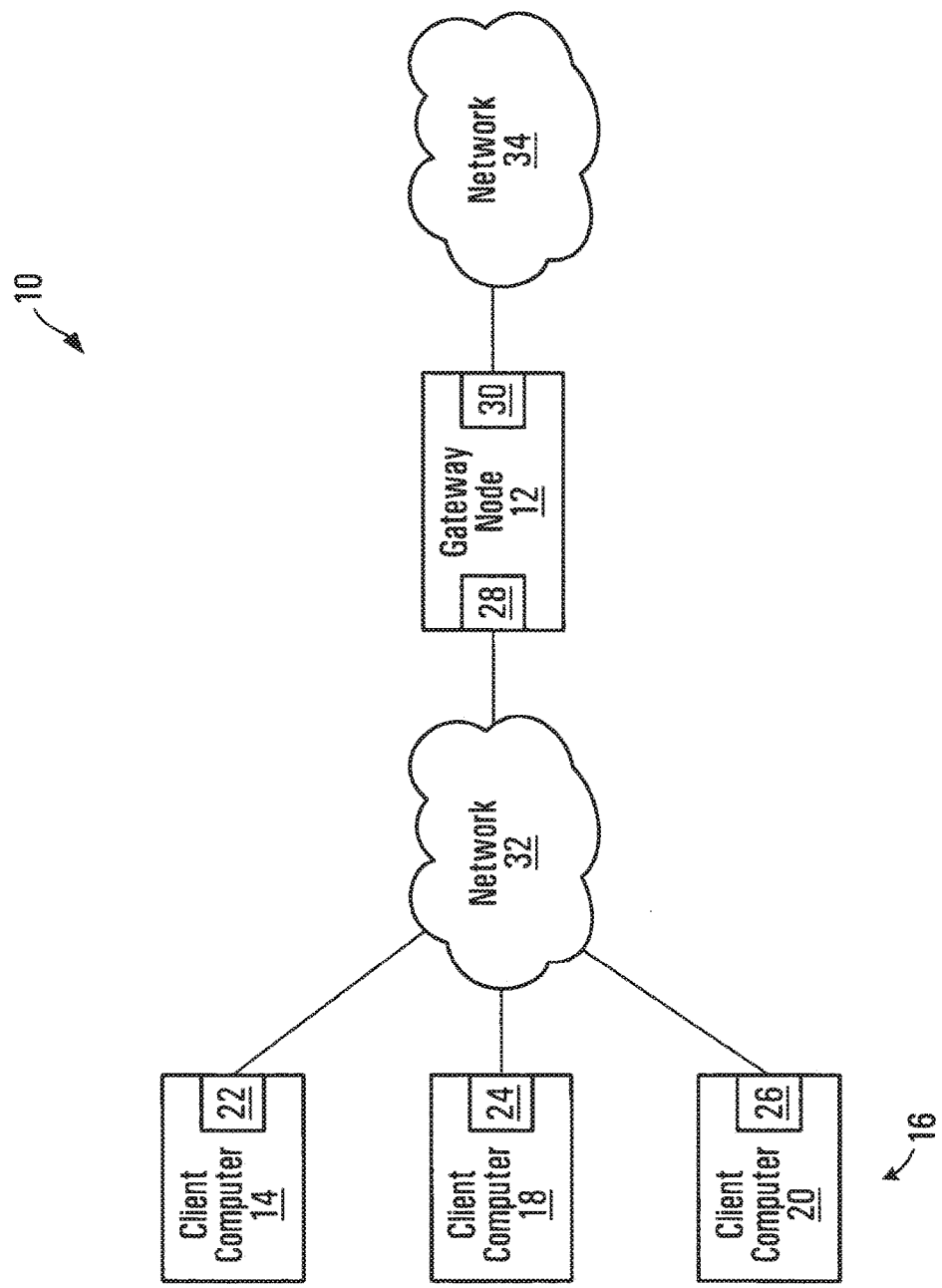
FIG. 1 is a block diagram of a system for enforcing compliance with a policy according to a first embodiment of the invention.

Referring to FIG. 1, a system for enforcing compliance with a policy is shown generally at 10. The system includes a gateway node 12, which includes a first interface 28 and a second interface 30. The first interface 28 facilitates communication between the gateway node 12 and a first network 32. The second interface 30 facilitates communication between the gateway node 12 and a second network 34.

The system further includes a plurality of client computers 16, of which a first client computer 14, a second client computer 18, and a third client computer 20 are shown in FIG. 1. The first client computer 14 includes an interface 22, the second client computer 18 includes an interface 24, and the third client computer 20 includes an interface 26. Each of the interfaces 22, 24, and 26 facilitate communication between their respective client computers 14, 18 and 20, and the first network 32.

In one embodiment, the first network 32 is a local area network (LAN) and the second network 34 is a wide area network (WAN). Generally, the above components co-operate to permit data transmissions to occur between the client computers 16 and the first and/or second networks 32 and 34.

More particularly the system 10 implements a method for enforcing compliance with a policy on the client computer 14 in communication with the first network 32. A data transmission is received from the client computer 14 on the first network 32. The data transmission includes status information associated with the client computer 14. The data transmission is permitted to continue when the status information meets a criterion.

Figure 2:
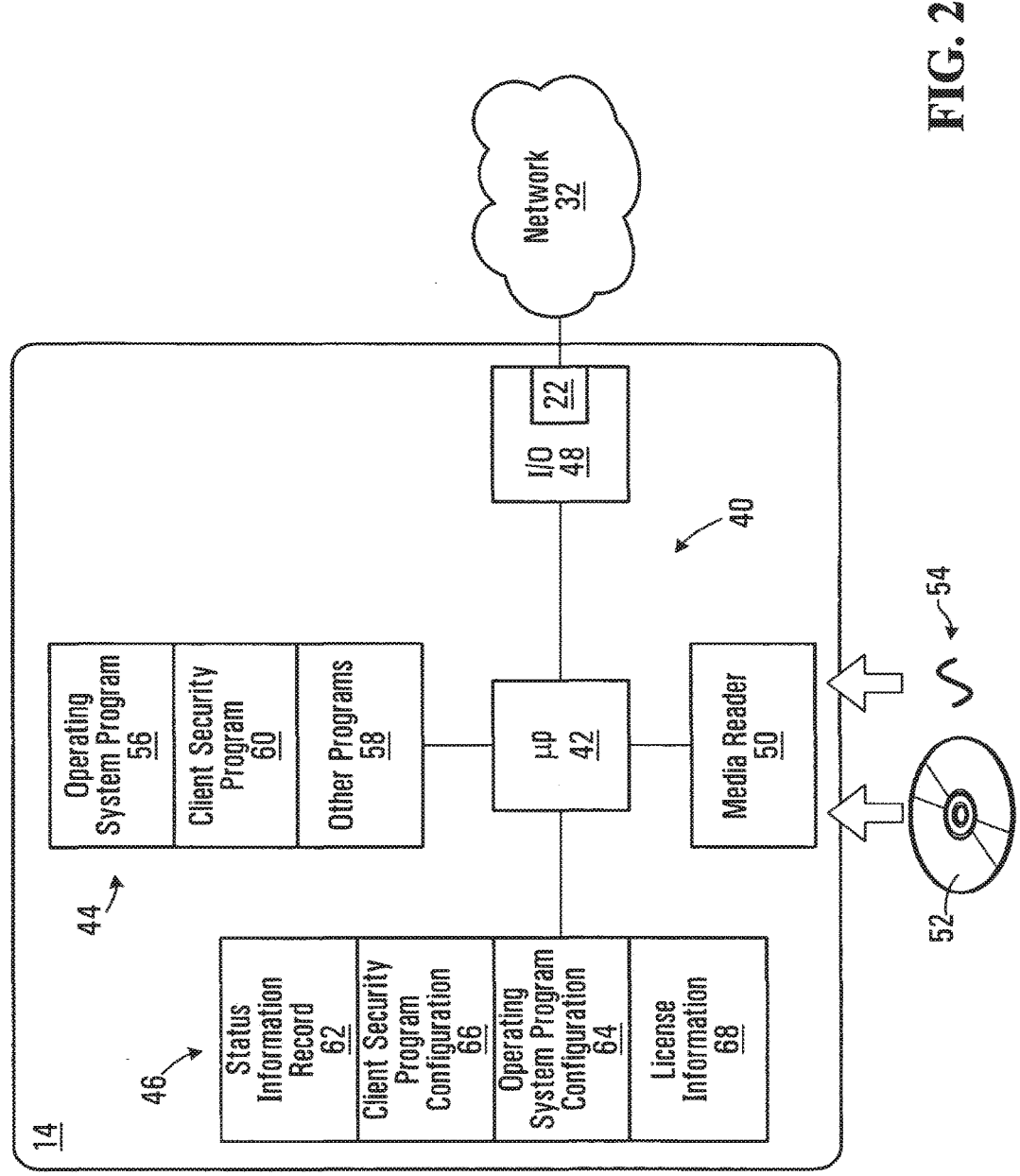
FIG. 2 is a block diagram of a client computer shown in FIG. 1.

In greater detail, referring to FIG. 2, the client computer 14 includes a processor circuit shown generally at 40. The processor circuit 40 includes a microprocessor 42, a program memory 44, parameter memory 46, an input/output (110) port 48, and a media reader 50. The program memory 44, the parameter memory 46, the 1/0 48, and the media reader 50 are all in communication with the microprocessor 42. The 110 48 includes the interface 22, which is communication with the first network 32. In one embodiment the interface 22 includes a network interface card, such as an Ethernet® interface card. The media reader 50 facilitates loading program codes into the program memory 44 from a computer-readable medium. The computer-readable medium may include a CD-ROM 52, which is encoded with the program codes. Alternatively the computer-readable medium may include a wired or wireless internet connection 54, and the program codes may be encoded in a computer-readable signal, which is received by the processor circuit 40 over the computer-readable medium.

Program codes for directing the microprocessor 42 to carry out various functions are stored in the program memory 44, which may be implemented as random access memory (RAM) and/or a hard disk drive (HDD) or a combination thereof.

For example, the program memory 44 may include a first set of operating system program codes 56 for directing the microprocessor 42 to carry out operating system functions. The program memory 44 may further include a second set of program codes 58 for directing the microprocessor 42 to carry out other functions, such as word processing, spreadsheets, email, or web browsing, for example. In this embodiment the program memory also includes a set of client security program codes 60 for directing the microprocessor 42 to carry out client security functions.

Configuration codes associated with various programs being executed by the microprocessor 42 are stored in the parameter memory 46, which may be implemented as random access memory (RAM), and/or a hard disk drive (HDD) or a combination thereof. The parameter memory 46 includes a block of memory for storing a set of client operating system configuration codes 64 associated with the operating system program 56. In this embodiment the parameter memory 46 also includes a block of memory for storing a set of client security program configuration codes 66 associated with the client computer 14. The parameter memory 46 further includes a block of memory for storing license codes 68 associated with software license information for the client security program 60.

The parameter memory 46 also includes a block of memory for storing a status information record 62, including status information associated with the client computer 14. An exemplary status information record is shown generally at 80 in FIG. 3.

In this embodiment the status information record 80 includes a plurality of data records 82, 84, and 86, each data record including an identification field (ID) 88, a length field 90, and a data field 92. The length field 90 holds a number defining the length of the data field 92. The data field 92 holds configuration or status information associated with a particular ID 88. In one embodiment, the ID field 88 and the length field 90 are packed into a single byte of data, the ID and length fields each occupying 4 bits. The 4 bit ID field in this embodiment allows 16 data records, although if necessary more data records could be accommodated by increasing the size of the ID field or by nesting data records.

The status information record 80 may optionally include a checksum 94, which may be used to verify the integrity of the status information. In one embodiment the checksum 94 is a 16 bit (2 byte) one's complement checksum, which may be calculated using the same function used to calculate Internet Protocol (IP) packet header checksums.

In one embodiment, when the ID field is set to zero, this indicates the end of the status information record 80, in which case the ID field 96 of the data record 86 would be set to zero, indicating the record 86 is the last data record.

Referring back to FIG. 1, in one embodiment the data transmission from the client computer 14 complies with a hypertext transfer protocol (HTTP). The HTTP protocol is a request/response protocol, in which a client sends a request to a server and the server responds by sending a message including information content, which may include hypertext mark-up language (HTML) codes which may be interpreted by programs running on the client computer 14 to display a web page. An exemplary HTTP request is shown at 100 in FIG. 4. The HTTP request 100 complies with the HTTP 1.1 protocol, detailed in Document RFC 2616, by Fielding et al., 1999. The HTTP request 100 includes an initial line 102 including a method name 104 (in this case the 'GET' method), a local path of the requested resource (in this case a root path "f"), and a version number 108 corresponding to the HTTP protocol version being used. The initial line 102, and subsequent lines, are terminated by a [CRLF] code 110. The HTTP request 100 further includes a plurality of header lines 112, of which only the "Host:" header line 114 is required by the HTTP 1.1 protocol, the remaining header lines 116 being optional. In this embodiment the HTTP request 100 includes a header line 118 including the status information record 80 shown in FIG. 3.

In other embodiments the data transmission may comply with any one of a large number of data transmission protocols, including but not limited to simple mail transfer protocol (SMTP), file transfer protocol (FTP), post office protocol version 3 (POP3), internet message access protocol (IMAP), TELNET network protocol, and domain name system (DNS) protocol, voice over internet protocol (VoIP), a peer-to-peer (P2P) protocol, dynamic host configuration protocol (DHCP), and/or a point-to-point (PPP) protocol. Many data transmission protocols permit optional user fields to be inserted in a data transmission complying with the protocol, while some of these protocols may have to be modified to allow the status information to be inserted in the data transmission.

For example, FTP, SMTP and POP3 protocols issue request commands to a server and then wait for reply. For these protocols, a modified request that has provisions for including the status information record 80 may be used. Accordingly, the gateway node 12 may be configured to require requests complying with these protocols to be in the modified form, and may ignore requests not in this form or respond with a message indicating that the request was not in a valid form.

Figure 5:
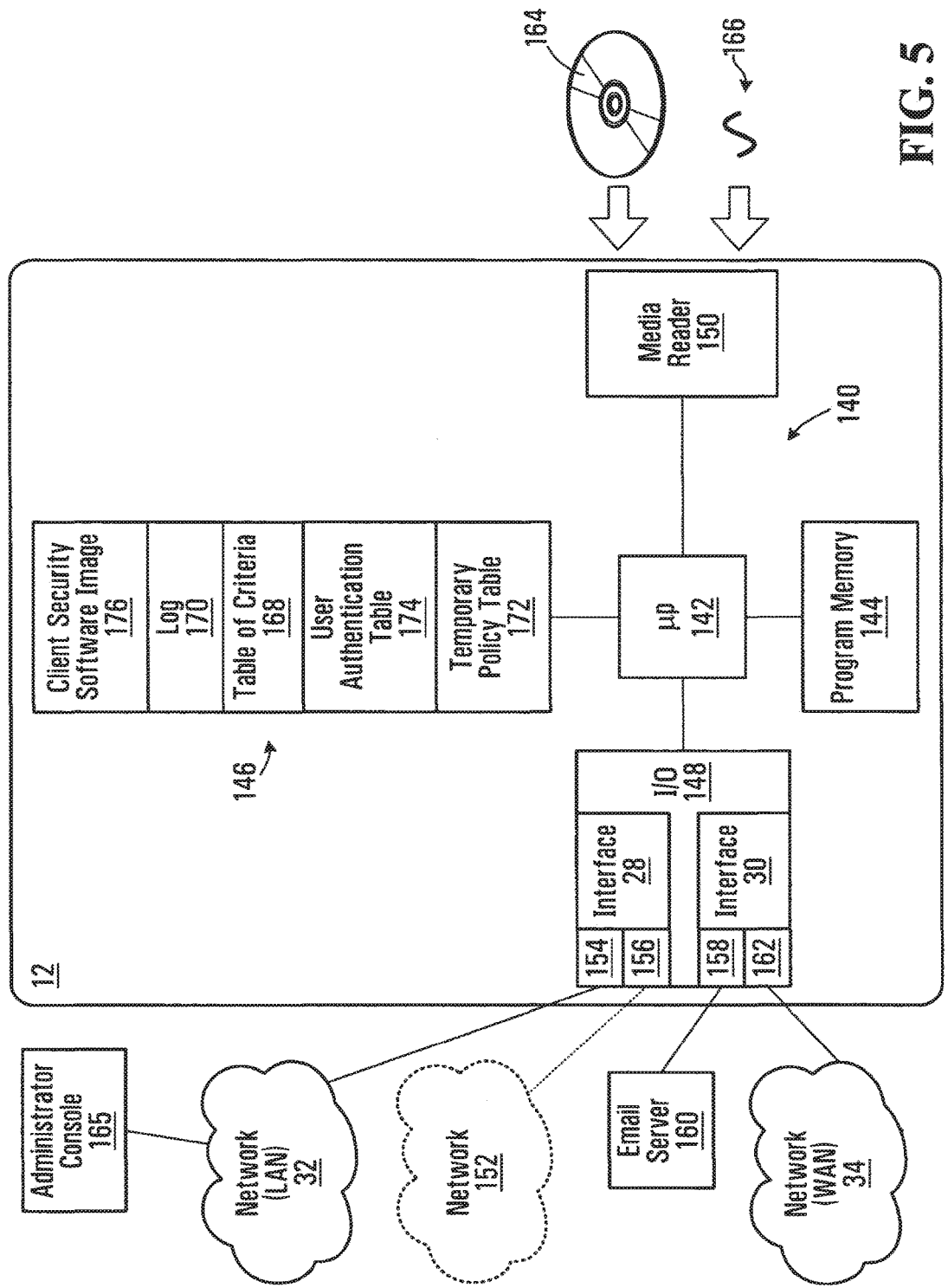
FIG. 5 is a block diagram of a gateway node shown in FIG. 1.

Referring again to FIG. 1, the gateway node 12 is shown in greater detail in FIG. 5. Referring to FIG. 5, in one embodiment, the gateway node 12 includes a processor circuit shown generally at 140. The processor circuit 140 includes a microprocessor 142, a program memory 144, parameter memory 146, an input/output (I/O) port 148, and a media reader 150. The program memory 144, the parameter memory 146, the 110 148, and the media reader 150, are all in communication with the microprocessor 142. The program memory 144, stores blocks of codes, such as an operating system block of codes for directing the processor circuit 140 to carry out the gateway node functions.

The 110 148 includes the first interface 28 and the second interface 30. In one embodiment the first interface 28 is operably configured to implement one or more logical interfaces, of which two logical interfaces 154 and 156 are shown. The first interface 28 may be a VLAN switch, which permits multiple local interfaces to be defined in a network in accordance with the IEEE 80.210 specification. The IEEE 80.210 specification defines protocols for allowing multiple bridged networks to transparently share the same physical network link, without leakage of information between networks. Alternatively, the first interface 28 and/or the second interface may be physical interfaces, such as an Ethernet® network interface card or may be another type of logical interface such as a tunnel (e.g. Generic Routing Encapsulation (GRE), or Internet Protocol Security (IPSec)), an aggregated interface (e.g. an interface in accordance with networking standard IEEE 802.3ad), or a redundant link logical interface.

The logical interface 154 is in communication with the first network 32, which may be a local area network. The logical interface 156 may optionally be in communication with a further LAN sub-network or network 152.

The second interface 30 also includes a first logical interface 158, which is in communication with an email server 160, and a second logical interface 162, which is in communication with the second network 34, which in this case may be a wide area network. In one embodiment the networks 32, 152 and the email server 160 reside within an enterprise network while the network 34 is the internet, and the logical interface 162 communicates via an internet connection with the internet.

An administrator console 165 may be in communication with the gateway node 12 via the first network 32. The administrator console 165 may be a specially configured computer, facilitating administrator access to the gateway node 12 for configuring policies.

The media reader 150 facilitates loading program codes into the program memory 144 from a computer-readable medium. The computer-readable medium may include a CD-ROM 164, which is encoded with the program codes.

Alternatively, the computer-readable medium may include a wired or wireless internet connection 166, and the codes may be encoded in a computer-readable signal, which is received by the processor circuit 140 over the computer-readable medium.

The parameter memory 146 includes a block of memory for storing a table of criteria 168, a block of memory for storing a log 170, a block of memory for storing a temporary policy table 172, and a block of memory for storing a user authentication table 174.

The table of criteria 168 includes a plurality of records for holding criteria against which the status information is to be compared. The criteria may be established by default or may be set by a system administrator in accordance with a policy for administering the network 32 and the client computers 16 in communication with the network.

The log 170 is operable to record information associated with the data transmission.

The temporary policy table 172 is operable to hold an identifier identifying a specific client computer 16, when the specific client computer has completed a data transmission that meets the criteria held in the table of criteria 168. Subsequent data transmissions from the specific client computer are permitted to continue without reading status information, while the identifier appears in the temporary policy table. The temporary policy table may also optionally hold a first timestamp field including information identifying when the temporary policy was generated and a second timestamp field indicating a time of a last data transmission from the client computer 14.

The user authentication table 174 is operable to hold records associated with a plurality of users of the first network 32, and/or the network 152. In one embodiment, the user authentication table 174 includes a list of usernames, and their associated passwords. Alternatively the system 10 (shown in FIG. 1) may include a separate user authentication system (not shown) for authenticating users of the network. The separate user authentication system may include an authentication server in communication with the network 32.

In one embodiment, the gateway node 12 is in communication with the email server 160 via the second interface 30 (through the logical interface 158). The email server 160 facilitates sending an email message to a user of the client computer 14, which for example, may include details indicating reasons why a data transmission has not been permitted to continue through the gateway node 12.

The program memory 144 may include a block of memory 176 for storing a client security program image. When the client computer 14 attempts a data transmission and the status information does not meet the criteria stored in the table of criteria 168, the gateway node 12 may send a message to the user of the client computer 14 including information informing the user of a location of a file for updating the client security program, anti-virus signatures, and/or intrusion protection system signatures.

Operation-Client Computer

Figure 6:
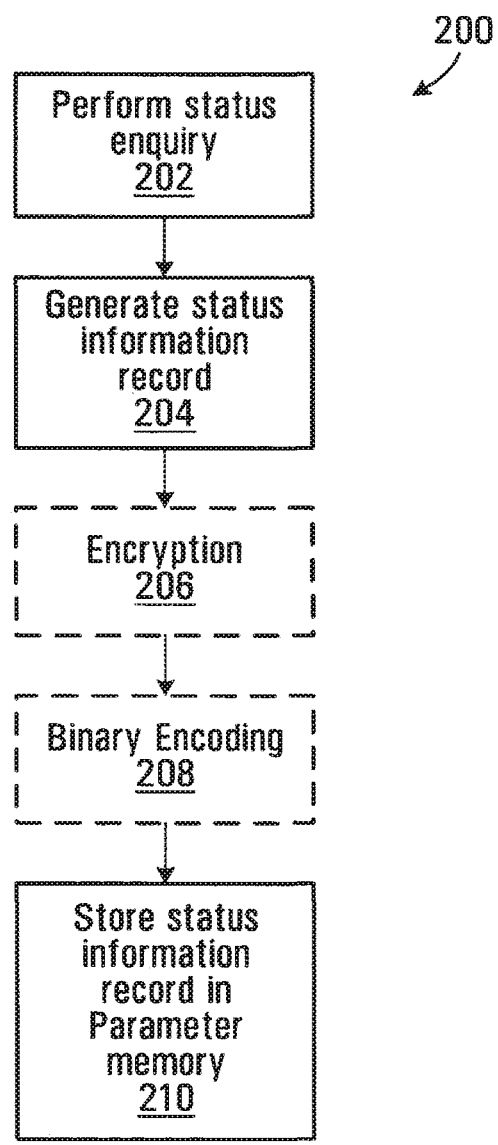
FIG. 6 is a flowchart of a status enquiry process executed by the client computer shown in FIG. 2.

The operation of the client computer 14 is described with reference to FIG. 2 and FIGS. 6 and 7. Referring to FIG. 6, a flowchart depicting blocks of code for directing the processor circuit 40 in FIG. 2 to perform a status enquiry on the client computer 14 is shown generally at 200. The blocks generally represent codes that may be read from the computer-readable medium 52 or 54, and stored in the program memory 44, for directing the microprocessor 42 to perform various functions related to the status enquiry. The actual code to implement each block may be written in any suitable program language, such as C, C++, and/or assembly code, for example.

The process begins with the first block of codes 202, which directs the microprocessor 42 to perform a status enquiry on the client computer 14, which may involve querying various configuration files, registers, and other system parameters to obtain information regarding the state of the client computer. For example, the status enquiry may involve reading some of the client security program configuration codes 66 stored in the parameter memory 46 to determine whether a client security program is running on the client computer 14 and a version associated with the client security program that is installed on running on the client computer. In one embodiment the status enquiry also includes reading the license codes 68 stored in the parameter memory 46, to obtain license information associated with the client security program installed and/or running on the client computer.

In one embodiment, block 202 directs the microprocessor 42 to read the client security program configuration codes 66 and to generate a hash value representing the configuration codes. The hash value is generated by applying a hash function to the configuration codes 66, resulting in a hash value that occupies less memory bytes than the configuration codes, and is generated in such a way that it is extremely unlikely that some other codes will produce the same hash value. Accordingly, the hash value of the configuration codes 66 uniquely represents a full configuration of the client security program installed on the client computer 14 and may be used where it is desired to perform a rigorous check of the client security program configuration.

In one embodiment, block 202 also directs the microprocessor 42 to determine information in connection with a firewall zone configuration, and information associated with other software programs, other than the client security programs installed on the client computer 14. Various aspects of the operating system program configuration may be determined by reading the operating system configuration codes 64 and the gateway node 12 may be configured to prevent data transmissions from client computers 14 that do not have a certain configuration or version of operating system. For example, data transmissions may be prevented from client computers 14 that have Microsoft Windows XP operating system installed, but which have not installed a service pack (SP) such as SP2. In general, the status information may include not only information associated with the client security software, but also information associated with other software versions and configurations.

Block 204 directs the microprocessor 42 to produce the status information record 80 (shown in FIG. 3) by writing the status information obtained in block 202 to the various data records 82, 84 and 86 of the status information record.

Figure 3:
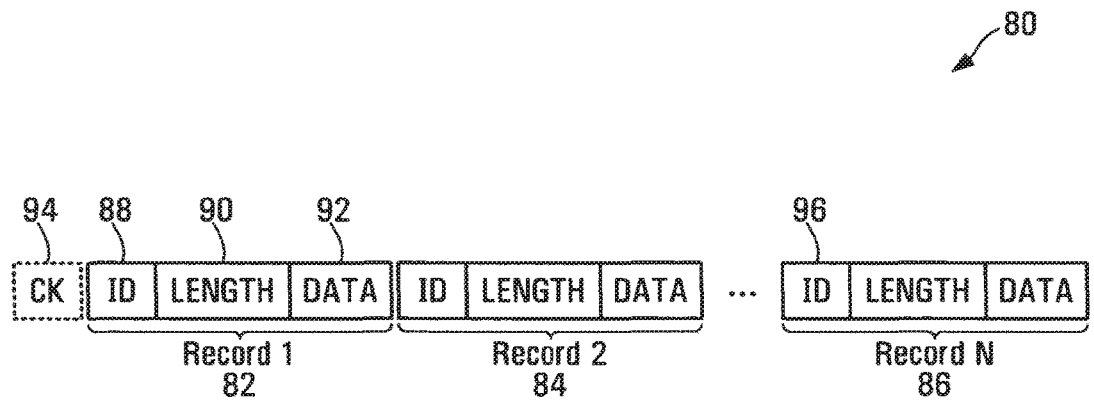
FIG. 3 is a block diagram of a status information record produced by the client computer shown in FIG. 2.
Figure 4:
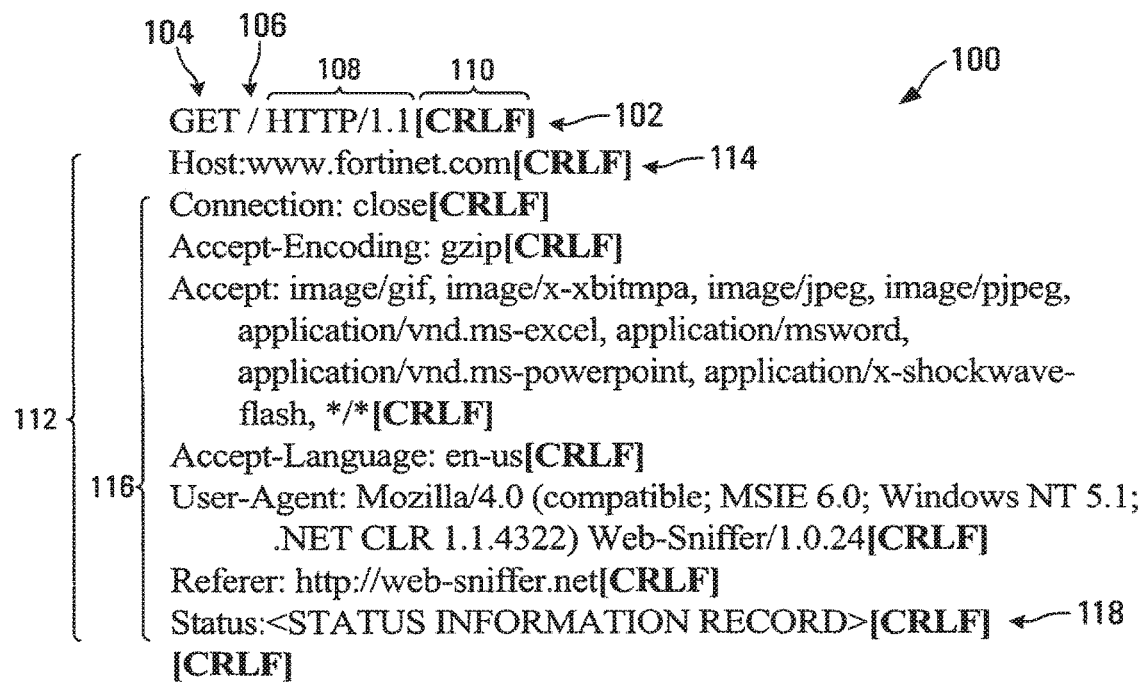
FIG. 4 is a representation of a data transmission from client computer including the status information record shown in FIG. 3.

Optionally, block 206 directs the microprocessor 42 to encrypt the data records 82, 84, and 86, shown in FIG. 3. In one embodiment the data records 82, 84, and 86 are encrypted using a stream cipher such as RC4®. RC4 uses a pseudo-randomly varying keystream to encrypt plaintext characters one at a time, by exclusive-oring (XOR) the keystream with the plaintext character. Encrypting the data record provides additional security against the replay or spoofing attacks, where a malicious user attempts to defeat network security policies in place.

Optionally, block 208 directs the microprocessor 42 to perform a binary encoding of the encrypted data records 82, 84, and 86. Binary encoded data records generally occupy less memory bytes than textual data records, thus reducing data transmission overhead associated with including the status information in the data transmission, where this is important. In one embodiment, where the data transmission protocols require that the data contained in a data transmission must be in text format, the binary-encoded data records 82, 84, and 86 may be encoded into a text stream using a binary-to-text encoding scheme such as Base64. Base64 encodes 3 bytes of binary data into 4 bytes of ASCII text, thus resulting in a file size that is approximately 33% larger than the binary data record, but still smaller than a plain text data record.

Block 210 directs the microprocessor 42 to store the status information in the status information record memory 62 in the parameter memory 46 of the processor circuit 40.

Figure 7:
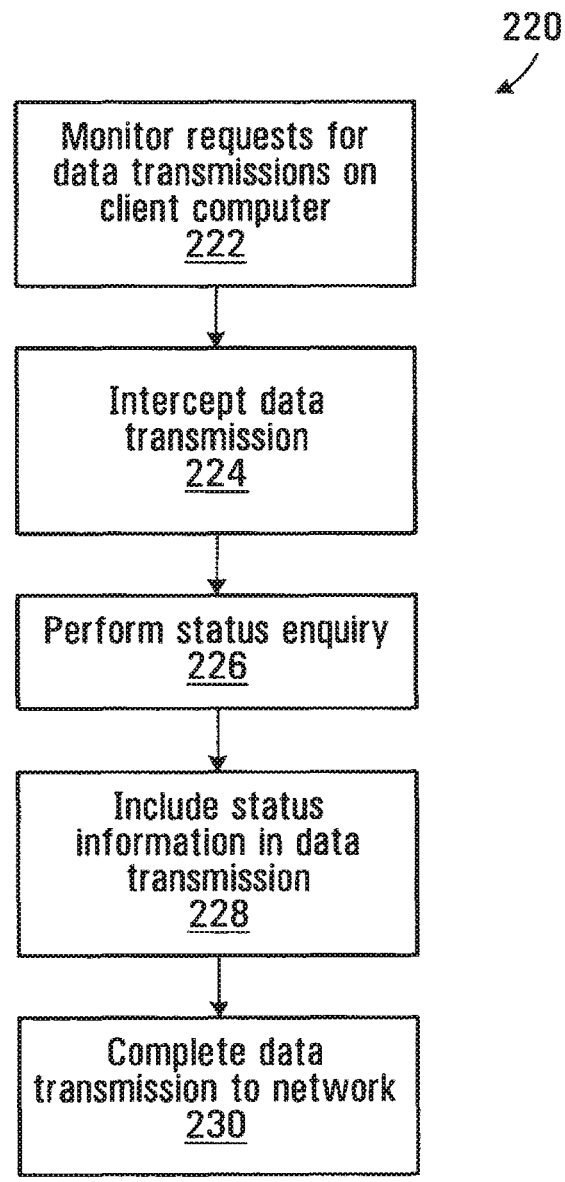
FIG. 7 is a flowchart of a data transmission process executed by the client computer shown in FIG. 2.

Referring to FIG. 7, a flowchart depicting blocks of code for directing the processor circuit 40 to carry out a data transmission is shown generally at 220. The process begins with a first block of codes 222, which directs the microprocessor 42 to monitor requests for data transmissions generated by various programs running on the processor circuit 40. The client computer 14 may have installed any number of software programs which, when running, may generate a request for a data transmission to the first network 32. Requests may be initiated by a user operating a software program on the client computer 14, or an operating system installed on the client computer may initiate a data transmission to update software installed on the computer or perform other automated functions, for example. For example, where the client computer 14 is running a Microsoft Windows® operating system, the microprocessor 42 may determine that a data transmission has been requested by monitoring calls to the Windows Sockets (or Winsock) program. Winsock is an Application Program Interface (API) that facilitates data transmissions from Windows programs in a number of data transmission protocols including HTTP, POP3, SMTP, FTP, IMAP, and Telnet. Block 224 directs the microprocessor 42 to intercept the data transmission.

In this embodiment block 226 directs the microprocessor 42 to perform the status enquiry 200 shown in FIG. 6. Alternatively, in one embodiment, the status enquiry 200 is performed at some fixed time interval and thus the status information record 80 is already stored in status information record memory 62 in the parameter memory 46, in which case block 226 may then be omitted from the process 220.

Block 228 directs the microprocessor 42 to read the status information record 80 stored in status information record memory 62 in the parameter memory 46, and to include the status information record in the data transmission.

Block 230 then directs the microprocessor 42 to cause the data transmission to the first network 32 to be carried out.

Operation-Gateway

Figure 8:
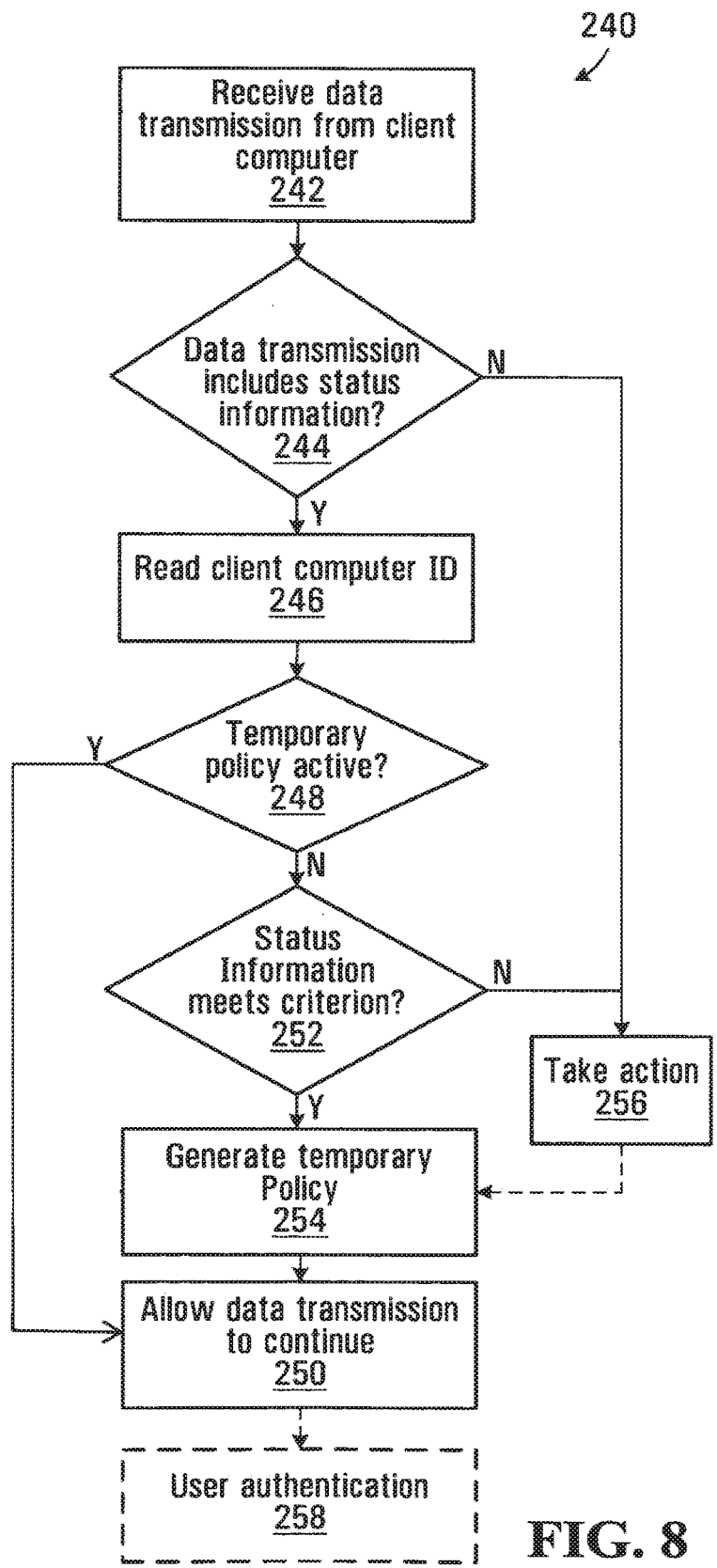
FIG. 8 is a flowchart of a process executed by the gateway node shown in FIG. 5.

The operation of the gateway node 12 is described with reference to FIG. 5 and FIG. 8. Referring to FIG. 8, a flowchart depicting blocks of codes for directing the processor circuit 140 to implement the method for enforcing compliance with the policy is shown generally at 240. The blocks generally represent codes that may be read from the computer-readable medium 164 or 166, and stored in the program memory 144, for directing the microprocessor 142 to perform various functions related to the method.

In this embodiment the process begins with a first block of codes 242, which causes the microprocessor 142 to direct the 1/0 148 to receive a data transmission on one of the logical interfaces 154 or 156.

Block 244 then directs the microprocessor 142 to determine whether or not the received data transmission includes status information.

If the received data transmission does include status information, then block 246 directs the microprocessor 142 to read a client identifier (ID) in the data transmission. For example where the data transfer complies with a HTTP protocol, and is transferred over the network 32 in as a data packet complying with Transmission Control Protocol/Internet Protocol (TCP/IP), then the client identifier may be the IP address associated with the client computer.

Block 248 directs the microprocessor 142 to determine whether or not a temporary policy for the client computer 14 is active. If an active temporary policy for the client computer 14 is found then block 248 further directs the microprocessor 142 to update the second timestamp field indicating the time of the last data transmission from the client computer 14 in the temporary policy table 172 to reflect a current system time.

The process then continues at block 250, which directs the microprocessor 142 to allow the data transmission to continue. In one embodiment where the administrator has set a policy requiring a user of the client computer to input a username and/or password prior to performing a data transmission the process 240 may include a further optional block of codes 258, which directs the microprocessor 142 to send a message to the user of the client computer 14 to supply their username and/or password. Block 258 further directs the microprocessor 142 to look up the supplied username in the user authentication table 174 stored in the parameter memory 146, and to verify the supplied password against the password in the table. If the password matches the data transmission is permitted to continue. Alternatively, where the system 10 includes a separate user authentication system, block 258 may direct the microprocessor 142 to communicate with the user authentication server over the network 32.

If at block 248 no active temporary policy is found, the process continues at block 252, which directs the microprocessor 142 to determine whether the status information included in the data transmission meets the criterion.

The table of criteria 168 in the parameter memory 146 includes at least one criterion, but generally includes a plurality of criteria. The criteria may be default criteria set by the operating system program running on the processor circuit 140 and/or may be specifically set by the administrator of the network in accordance with a policy that has been set for users of the network. For example, the table of criteria 168 may include criteria such as whether or not a client security program is running on the client computer 14, version information and license information associated with the client security program installed on the client computer, configuration information associated with the client security program installed on the client computer, version information associated with an anti-virus signature database or an intrusion protection system signature database stored on the client computer, firewall zone configuration information associated with a client computer, and version information associated with other software installed on the client computer.

The table of criteria may also include other criteria set by the administrator of the system. In one embodiment status information record 80 in the data transmission from the client computer 14 may include the hash value of the configuration codes 66, as detailed above. In this case one of the criteria in the table of criteria 168 may include the hash value corresponding to a desired configuration. If the hash value in the status information included in the data transmission matches the desired hash value, then the configuration is deemed to have met this criterion.

Thus block 252 directs the microprocessor 142 to compare the status information included in the data transmission with the criteria in the table of criteria 168, and if the status information meets all of the criteria, then the process continues at block 254.

Block 254 directs the microprocessor 142 to generate a temporary policy for the client computer 14 by storing the client computer ID in the temporary policy table 172 in the parameter memory 146. The temporary policy permits subsequent data transmissions from the client computer 14, identified by an ID stored in the temporary policy table 172, to continue while the a temporary policy for the client computer is active.

After the temporary policy has been generated, the process continues at block 250, which directs the microprocessor 142 to allow the data transmission to continue.

If at block 252, the microprocessor 142 determines that the status information does not meet the criterion, then the process continues at block 256.

Block 256 directs the microprocessor 142 to cause an action to be taken. The action to be taken may be configured by an administrator or may be set by default in the operating system software.

In one embodiment the action involves causing an entry to be made in the log 170 stored in parameter memory 146. Alternatively, or additionally the action may involve causing an alert to be issued. The alert may be issued in the form of an email message to the administrator of the network and/or to the user of the client computer 14.

The administrator may configure the gateway node 12 to allow the data transmission to continue once the log entry has been made and/or the alert issued.

Alternatively, the administrator may configure the gateway node 12 to prevent the data transmission from continuing until the user of the client computer 14 takes corrective action to bring the client computer into compliance with the policy. Accordingly, block 256 may cause the microprocessor 142 to direct the 110 148 to access the email server 160 via the logical interface 158, to cause an email message to be sent to a user of the client computer 14 or to the administrator console 165, via the first network 32. The email message may indicate that the data transmission has been prevented from continuing and further may include information on aspects of the criterion that are not met by the status information transmitted by the client computer. In one embodiment, the message may also include a network resource location where the user of the client computer 14 can download data updating the configuration of the client computer 14. For example, the network resource location may include information related to a location of a client security program image for installing the security program, a location of a file for updating anti-virus signatures associated with potential computer virus attacks, and/or a location of a file for updating intrusion protection system (IPS) signatures associated with potential network intrusions.

In another embodiment, block 256 directs the microprocessor 142 to send a message to the client computer 14 indicating that a software license associated with the client security program installed on the client computer 14 is not valid, or that a configuration associated with the client security program does not meet the criterion for permitting the data transmission to proceed. Where the data transmission is an http data transmission, the processor circuit 140 of the gateway node 12 may send an HTTP redirect response to the client computer 14, which redirects the client computer to a web page containing at least some of the above-mentioned information. The web page may include links to network resources for downloading data, acquiring a new license, or updating the configuration of the client computer 14.

Operation-Temporary Policy

Figure 9:
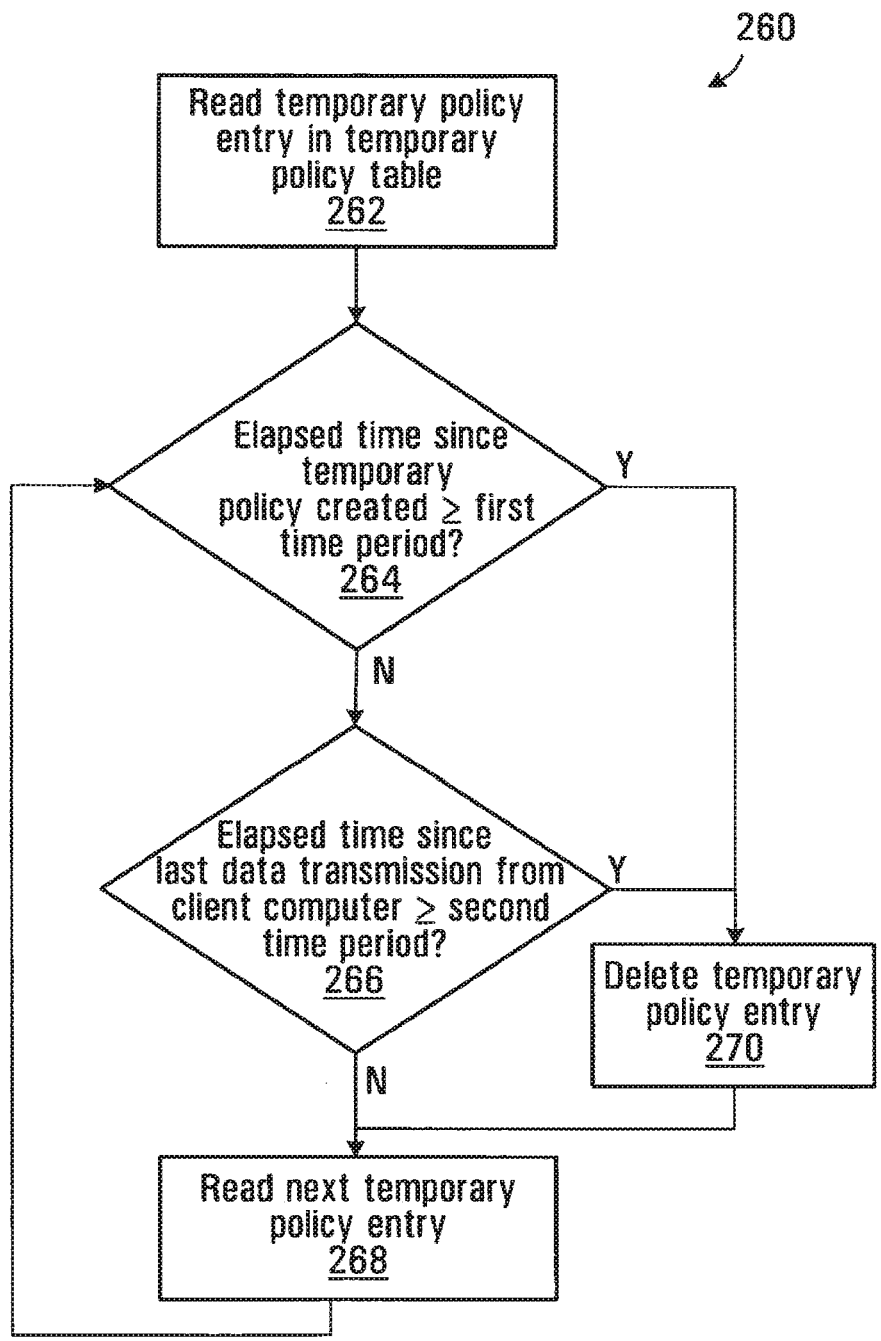
FIG. 9 is a flowchart of a temporary policy process executed by the gateway node shown in FIG. 5.

Referring to FIG. 9, a flowchart depicting blocks of code for directing the processor circuit 140 to maintain the temporary policy table 172, stored in parameter memory 146, is shown generally at 260.

The process starts at block 262, which directs the microprocessor 142 to read an entry from the temporary policy table 172 in the parameter memory 146.

Block 264 directs the microprocessor 142 to read the first timestamp field indicating when the temporary policy was generated in the temporary policy table 172, and to determine an elapsed time since the temporary policy was generated. Block 264 further directs the microprocessor 142 to determine whether the elapsed time is greater than a first time period set by the administrator, in which case the process continues at block 266.

Block 266 directs the microprocessor 142 to read the second timestamp field indicating the time of the last data transmission from the client computer 14 in the temporary policy table 172. Block 266 further directs the microprocessor 142 to determine whether or not an elapsed time since the last data transmission from the client computer 14 is greater than a second time period. If not, then the process continues at block 268, which directs the microprocessor 142 to read the next temporary policy entry in the temporary policy table 172. Block 268 then directs the microprocessor 142 back to block 264 to process the next temporary policy entry.

If at block 264, the microprocessor 142 determines that the elapsed time since the last data transmission from the client computer 14 is greater than a second time period then the process continues at block 270, which directs the microprocessor 142 to delete the temporary policy entry. The effect of deleting the temporary policy entry is to cause status information associated with the client computer 14 to be reread and evaluated against the criteria when the next data transmission occurs from the client computer 14.

The effect of the process 260 is to allow data transmissions from the client computer 14 to continue without checking status information, and thus without delaying data transmissions, for a period of time set by the administrator. The administrator may set a first period of time, which acts as a hard time-out when an age of the temporary policy is greater than the first period of time. The administrator may also set an idle timeout, which causes the temporary policy to expire when the client computer 14 has not made a data transmission for a second period of time.

For example, the first time period may be set to 30 minutes, and the second time period may be set to 5 minutes, thus causing status information associated with the client computer 14 to be evaluated against the criteria at least every 30 minutes, possibly sooner if the client computer 14 does not make a data transmission in a 5-minute period.

While specific embodiments of the invention have been described and illustrated, such embodiments should be considered illustrative of the invention only and not as limiting the invention as construed in accordance with the accompanying claims.

What is claimed is:

1. A computer-implemented method in a gateway node device for enforcement of client computer policy compliance on a communication network, the method comprising the steps of:

receiving, on the communication network, a data transmission from a client computer comprising status information, the status information associated with a configuration and operational status of the client computer and including hashed representations of the client computer configuration and operational status data of a license for at least one program installed on the client computer;

determining if a temporary policy for the client computer is active, the temporary policy generated for the data transmission;

responsive to a determination that the temporary policy for the client computer is active, permitting the data transmission to continue;

responsive to a determination that the temporary policy for the client computer is not active, determining whether the status information meets a criteria, the criteria determined through a matching of the hashed representations of the client computer configuration and operational status data of a license for at least one program installed on the client computer with desired hash values; and responsive to a determination that the status information does not meet the criteria:
preventing the data transmission from continuing; and
sending, on the communication network, a message to the client computer indicating an invalid license for the at least one program installed on the client computer and providing information to network resources for remediation of the invalid license.

2. The computer-implemented method of claim 1, wherein a process on the client computer intercepts a data transmission, and adds the status information to the data transmission, prior to being sent to the gateway node device.

3. The computer-implemented method of claim 2, wherein the status is added to header fields in at least one frame involved in the data transmission, prior to being sent to the gateway node device.

4. The computer-implemented method of claim 1, wherein a first time stamp indicates when a temporary policy was initiated.

5. The computer-implemented method of claim 1, wherein a second time stamp indicates when a last transmission was sent by the client computer.

6. The computer-implemented method of claim 1, wherein the network resources comprise
redirecting the client computer to a web page allowing remediation of the invalid license.

7. The computer-implemented method of claim 1, further comprising the steps of:
determining if the invalid license has been remedied;
in response to a determination that the invalid license has been remedied, allowing the data transmission to continue.

8. The computer-implemented method of claim 7, wherein the determination of whether the invalid license has been remedied is determined through a matching of the hashed representations of the client computer configuration and operational status data of a license for at least one program installed on the client computer with the desired hash values.

9. A non-transitory computer-readable medium storing computer instructions that, when executed by a processor, perform a method in a gateway node device for enforcement of client computer policy compliance on a communication network, the method comprising the steps of:

receiving, on the communication network, a data transmission from a client computer comprising status information, the status information associated with a configuration and operational status of the client computer and including hashed representations of the client computer configuration and operational status data of a license for at least one program installed on the client computer;

determining if a temporary policy for the client computer is active;

responsive to a determination that the temporary policy for the client computer is active, permitting the data transmission to continue;

responsive to a determination that the temporary policy for the client computer is not active, determining whether the status information meets a criteria, the criteria determined through a matching of the hashed representations of the client computer configuration and operational status data of a license for at least one program installed on the client computer with desired hash values; and responsive to a determination that the status information does not meet the criteria:
preventing the data transmission from continuing; and
sending, on the communication network, a message to the client computer indicating an invalid license for the at least one program installed on the client computer and providing information to network resources for remediation of the invalid license.

10. The computer-readable medium of claim 9, wherein a process on the client computer intercepts a data transmission, and adds the status information to the data transmission, prior to being sent to the gateway node device.

11. The computer-readable medium of claim 10, wherein the status is added to header fields in at least one frame involved in the data transmission, prior to being sent to the gateway node device.

12. The computer-readable medium of claim 9, wherein a first time stamp indicates when a temporary policy was initiated.

13. The computer-readable medium of claim 9, wherein a second time stamp indicates when a last transmission was sent by the client computer.

14. The computer-readable medium of claim 9, wherein the network resources comprise
redirecting the client computer to a web page allowing remediation of the invalid license.

15. The computer-readable medium of claim 9, further comprising the steps of:
determining if the invalid license has been remedied;
in response to a determination that the invalid license has been remedied, allowing the data transmission to continue.

16. The computer-readable medium of claim 15, wherein the determination of whether the invalid license has been remedied is determined through a matching of the hashed representations of the client computer configuration and operational status data of a license for at least one program installed on the client computer with the desired hash values.

17. A gateway node device for enforcement of client computer policy compliance on a communication network, the gateway node device comprising:

a processor; and a memory, the memory storing:

a first module to receive, on the communication network, a data transmission from a client computer comprising status information, the status information associated with a configuration and operational status of the client computer and including hashed representations of the client computer configuration and operational status data of a license for at least one program installed on the client computer;

a second module to, determine if a temporary policy for the client computer is active;

a third module to, responsive to a determination that the temporary policy for the client computer is active, permit the data transmission to continue;

a fourth module to, responsive to a determination that the temporary policy for the client computer is not active, determine whether the status information meets a criteria, the criteria determined through a matching of the hashed representations of the client computer configuration and operational status data of a license for at least one program installed on the client computer with desired hash values; and a fifth module to, responsive to a determination that the status information does not meet the criteria, prevent the data transmission to continue, and send, on the communication network, a message to the client computer indicating an invalid license for the at least one program installed on the client computer and providing information to network resources for remediation of the invalid license.

* * * * *